(No Model.)
E. DETWILER.
KILN FOR FIRING DECORATED CHINA.
No. 329,373. Patented Oct. 27, 1885.
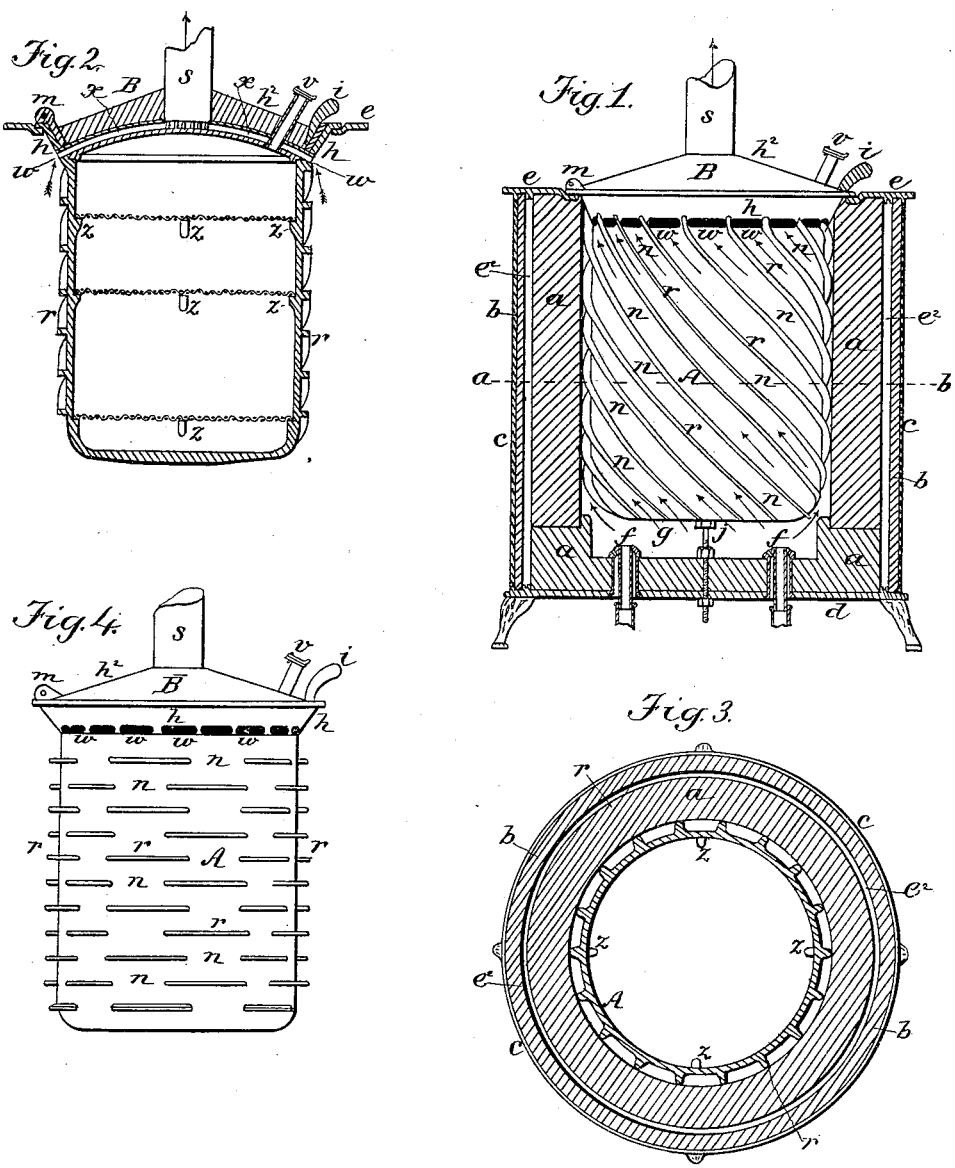

UNITED STATES PATENT OFFICE.

EMANUEL DETWILER, OF MILWAUKEE, WISCONSIN.

KILN FOR FIRING DECORATED CHINA.

SPECIFICATION forming part of Letters Patent No. 329,373, dated October 27, 1885.

Application filed June 30, 1885. Serial No. 170,272. (No model.)

*To all whom it may concern:*

Be it known that I, EMANUEL DETWILER, a citizen of the United States, residing at Milwaukee, in the county of Milwaukee and State of Wisconsin, have invented new and useful Improvements in Kilns for Firing Decorated China, of which the following is a specification.

My invention is directed to the production of a kiln specially adapted for what is known as "china-firing," and particularly for the utilization of gas as the heating medium to obtain the important advantages of portability of the kiln, requiring only to make gas-connections with burners, to obtain a uniform degree of heat free from dust and dirt, and to avoid the inconvenience and labor due to the use of solid fuel, which, for the purpose stated, is, so far as I know and can find, now used in such kilns. These objects I attain by the kiln illustrated in the accompanying drawings, in which—

Figure 1 is a vertical section of the complete kiln, the pot being shown in elevation. Fig. 2 is a vertical section of the pot, showing its double-walled cover. Fig. 3 is a horizontal section taken on the line $a\ b$ of Fig. 1; and Fig. 4 is an elevation of the pot, showing a modified arrangement of the surface-heat-distributing ribs.

The kiln proper is supported upon legs like a stove, and can be transported in complete form with gas-burners ready for use by making the gas-supply connections. The body of the kiln is preferably of cylindrical form, and consists of a thick wall and bottom of fire-clay, $a$, an outer wall, $b$, of concrete, and an inclosing metal casing, $c$, supported and bound together upon a metal base, $d$, and a top plate, $e$, so as to have an air-space, $e^2$, between the said walls and form a heat-retaining structure. Suitable gas-burners, $f$, are properly fitted in the bottom of the kiln, so as to enter its heating-chamber through air-supplying tubes, and provided with suitable couplings for connection with the gas-supply pipes. The metal pot A, for the reception of the wares to be fired, is properly fitted within the open top of the kiln and suspended therefrom by its colored or open flaring top $h$, so as to leave a bottom chamber, $g$, for the gas-jets within the heat-retaining wall. The lid B for the pot is also of metal double walls, to form the draft-passage $x$ for the products of combustion from the heating-chamber. The lid has a covering of fire-clay, $h^2$, is hinged to the pot at $m$, and has a handle, $i$, by which it may be turned back to place and remove the wares from the pot. The outer wall of the pot does not join the inner wall of the kiln, and the surface of the former is formed with ribs $r$, disposed in a manner to form flues $n$ all around the pot, the edges of said ribs joining the fire-clay wall. These flue-forming ribs may be arranged in spiral relation to each other like screw-threads, as shown in Fig. 1, or in horizontal interrupted relation, as shown in Fig. 4, or in any other way that will cause the flame and heat to pass up over the pot alike at all points from the bottom to its top, and be retarded in its passage alike at all points, so as to give a uniform temperature to the pot and prevent a rapid and direct exit of the products of combustion from the heating-chamber. Below the lid, at the top of the pot, the draft-passage $x$ of the former opens into the heating-chamber by wall-openings $w$, through which the products of combustion pass into said lid-passage $x$, and thence into the exit-pipe $s$, which is removably connected at the center of the lid in any suitable manner to allow the latter to be opened. The top draft-passage, $x$, may also be formed with ribs, preferably at the point of exit, as shown in Fig. 2, so as to retard the heat over the top of the pot.

To afford facility for observing the process of firing, a metal tube, $v$, with mica cover, is placed within the lid, and the inner wall of the pot has ledges or lugs $z$, for shelves of wire, for the support of the wares in separate tiers. In amateur work, where only a small firing-chamber is needed, the horizontal interrupted flue-forming ribs will be found sufficient for a proper diffusion and retention of the heat; but in kilns of larger size the spiral flue-forming ribs are preferable. In either case the heat products are forced to travel an increased distance and impinge constantly upon the pot, thus getting the full effect of the heat under an even distribution of a heat of unvarying intensity.

The pot can be removed from the kiln for cleaning it of carbon deposit, and, as an additional support for the pot, a control screw-stem, *j*, is secured in the bottom of the kiln and set by nuts, as shown in Fig. 1.

The hinged or removable cover makes a jointed connection of the top and bottom flues for the passage of combustion products from the heat-chamber below.

I claim—

1. The open-top kiln composed of heat-retaining walls and having bottom gas-burners, in combination with a china-firing pot seated within the heating-chamber of said kiln, substantially as described, for the purpose specified.

2. The combination, with a kiln having its heating-chamber provided with gas-burners, of a china-firing pot having wall flue-forming ribs and a lid having a draft-passage, substantially as described, for the purpose specified.

3. The combination of a kiln having walls formed of refractory substance, and an air-space and gas-burners entering the bottom of said kiln, with a china-firing pot having wall flue-forming ribs and a double-walled lid forming a draft-passage communicating with flue-forming ribs, covered with fire-clay, substantially as herein set forth.

4. The removable china-firing pot having wall-ribs, and a hinged lid having a draft-passage leading to a central exit, covered with fire-clay, in combination with a kiln having gas-burners, within the heating-chamber whereof the firing-pot is suspended from its top, substantially as herein set forth.

5. The baking pot or oven having a hinged-top heating-flue, combined with a bottom combustion-chamber and a heating-flue surrounding said pot communicating with said hinged-top flue, substantially as described.

6. The pot or baking-oven having a double-walled cover forming a top heating-flue, in combination with heating-flues surrounding said oven and a bottom combustion-chamber communicating with the flue of said cover, substantially as described, for the purpose specified.

7. The pot or baking-oven having outside surface-wall flue-forming ribs, in combination with a bottom combustion-chamber, and a removable double-walled cover forming a top heating-flue having heat-retarding ribs, and a central exit-flue, substantially as described.

In testimony whereof I have hereunto set my hand in the presence of two subscribing witnesses.

EMANUEL DETWILER.

Witnesses:
 ALFRED E. DETWILER,
 C. H. GUBESING.